US012623298B2

(12) United States Patent
Klimczuk et al.

(10) Patent No.: US 12,623,298 B2
(45) Date of Patent: May 12, 2026

(54) METHOD OF BRAZE REPAIR FOR EUTECTIC PHASE REDUCTION

(71) Applicant: GE Vernova Infrastructure Technology LLC, Greenville, SC (US)

(72) Inventors: Piotr Artur Klimczuk, Warsaw Masovian (PL); Joanna Siejka-Kulczyk, Warsaw (PL); Marek Miekus, Warsaw (PL); Michal Kowalczyk, Warsaw (PL)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/828,661

(22) Filed: Sep. 9, 2024

(65) Prior Publication Data

US 2025/0083244 A1 Mar. 13, 2025

(30) Foreign Application Priority Data

Sep. 12, 2023 (PL) ......................................... 446083

(51) Int. Cl.
B23K 1/00 (2006.01)
B23K 1/008 (2006.01)
(Continued)

(52) U.S. Cl.
CPC ............ B23K 1/0018 (2013.01); B23K 1/008 (2013.01); B23K 1/20 (2013.01); B23K 35/0244 (2013.01);
(Continued)

(58) Field of Classification Search
CPC ............ B23K 1/0018; B23K 2101/001; B23K 35/0244; B23K 35/3033
See application file for complete search history.

(56) References Cited

U.S. PATENT DOCUMENTS

| | | | |
|---|---|---|---|
| 5,666,643 A | 9/1997 | Chesnes et al. | |
| 5,806,751 A | 9/1998 | Schaefer et al. | |

(Continued)

FOREIGN PATENT DOCUMENTS

| | | |
|---|---|---|
| CN | 103551794 A | 2/2014 |
| CN | 107866617 A | 4/2018 |

(Continued)

OTHER PUBLICATIONS

Bouse et al., Optimizing SC René N4 Alloy for DS AFT-Stage Bucket Applications in Industrial Gas Turbines, Superalloys, 2008, 99-108. https://www.tms.org/superalloys/10.7449/2008/superalloys_2008_99_108.pdf.
(Continued)

*Primary Examiner* — Erin B Saad

(74) *Attorney, Agent, or Firm* — Dority & Manning, P.A.

(57) ABSTRACT

A method of repairing an article having a surface and a defect is provided. The method includes forming a groove in the article at the defect and the top surface. The method further includes providing a superalloy powder to the groove such that the superalloy powder at least partially fills the defect and the groove. The method further includes providing a braze powder on the superalloy powder at the groove and the surface. The method further includes heating the article such that the braze powder becomes a liquified braze material and infiltrates the groove and the defect.

20 Claims, 4 Drawing Sheets

(51) Int. Cl.
    *B23K 1/20*          (2006.01)
    *B23K 35/02*        (2006.01)
    *B23K 35/30*        (2006.01)
    *C22C 19/05*        (2006.01)

(52) U.S. Cl.
    CPC .......... *B23K 35/304* (2013.01); *C22C 19/057*
             (2013.01); *C22C 19/058* (2013.01)

(56) References Cited

U.S. PATENT DOCUMENTS

| | | | | |
|---|---|---|---|---|
| 6,283,356 | B1 * | 9/2001 | Messelling | B23K 35/304 228/119 |
| 6,364,971 | B1 * | 4/2002 | Peterson, Jr | B23K 9/044 219/121.64 |
| 6,520,401 | B1 * | 2/2003 | Miglietti | B23K 35/3046 228/248.1 |
| 7,360,678 | B2 * | 4/2008 | Pietruska | C23C 4/18 228/119 |
| 8,141,769 | B2 * | 3/2012 | Ott | B23P 6/007 228/119 |
| 9,771,816 | B2 * | 9/2017 | Weber | F01D 25/12 |
| 10,279,416 | B2 | 5/2019 | Whims et al. | |
| 10,556,294 | B2 | 2/2020 | Whims | |
| 10,625,361 | B2 * | 4/2020 | Eminoglu | B23K 26/144 |
| 11,207,751 | B2 * | 12/2021 | Puidokas | F01D 5/005 |
| 2005/0133122 | A1 * | 6/2005 | Jackson | C22C 30/00 148/430 |
| 2010/0187290 | A1 * | 7/2010 | Holi | B23P 6/002 228/119 |
| 2011/0088260 | A1 * | 4/2011 | Yoshioka | B22F 7/062 148/24 |
| 2012/0111928 | A1 * | 5/2012 | Park | B23K 35/0244 428/576 |
| 2013/0101828 | A1 * | 4/2013 | Park | B23K 35/0244 228/208 |
| 2015/0174707 | A1 * | 6/2015 | Li | B23K 1/00 427/142 |
| 2015/0343574 | A1 * | 12/2015 | Ozbaysal | C22C 19/055 148/528 |
| 2016/0279740 | A1 * | 9/2016 | Li | B32B 15/01 |
| 2018/0304420 | A1 * | 10/2018 | Zheng | B23K 35/304 |
| 2019/0047094 | A1 * | 2/2019 | Puidokas | B23K 26/32 |
| 2021/0086311 | A1 * | 3/2021 | Rebbecchi | B23P 6/00 |
| 2021/0115571 | A1 * | 4/2021 | Gao | B08B 3/12 |
| 2021/0146460 | A1 * | 5/2021 | Liu | B23K 1/19 |
| 2022/0176499 | A1 * | 6/2022 | Cui | C22C 19/058 |
| 2025/0018488 | A1 * | 1/2025 | Dorriety | B23K 3/087 |

FOREIGN PATENT DOCUMENTS

| | | | |
|---|---|---|---|
| CN | 105149597 B | 9/2018 | |
| GB | 2607537 A | * 12/2022 | ......... B23K 35/3033 |

OTHER PUBLICATIONS

Gale et al., Microstructural Development in Transient Liquid-Phase Bonding, Metallurgical Transactions A, vol. 22, 1991, 2451-2457. (Abstract Only) https://doi.org/10.1007/BF02665011.

Ghasemi et al., Intermetallic Phase Formation During Brazing of a Nickel Alloy Using a Ni—Cr—Si—Fe—B quinary Filler Alloy, Science and Technology of Welding & Joining, vol. 24, Issue 4, 2018, 1-10. http://dx.doi.org/10.1080/13621718.2018.1553280.

Guo, Materials Science and Engineering for Superalloys, Science Press, Beijing, vol. 109, 2008, 292. (Web Link Only) https://scholar.google.com/scholar?hl=en&as_sdt=0%2C41&q=Guo%2C+J.+T.+%22Materials+science+and+engineering+for+superalloys.%22+Beijing+Sci.+Press+109+%282008%29%3A+292&btnG=.

Huang et al., Wide Gap Braze Repair of Gas Turbine Blades and Vanes—A Review, The American Society of Mechanical Engineers (ASME), Journal of Gas Turbines Power, vol. 134, Issue 1, 2012, 17 Pages. (Abstract Only) https://doi.org/10.1115/1.4003962.

Juergon et al., Wide Gap Brazing in the Maintenance of Turbine Guide Vanes, Welding and Allied Processes in Aerospace Engineering, International Special Conference, 1985, 78-82. http://pascal-francis.inist.fr/vibad/index.php?action=getRecordDetail&idt=8361118.

Khakian et al., Effect of Bonding Time on the Microstructure and Isothermal Solidification Completion During Transient Liquid Phase Bonding of Dissimilar Nickel-Based Superalloys IN738LC and Nimonic 75, Journal of Alloys and Compounds, vol. 653, 2015, 386-394. (Abstract Only) https://doi.org/10.1016/j.jallcom.2015.09.044.

Li et al., Effect of Filler Metal on the Microstructural Evolution and Mechanical Properties of Wide Gap Brazed K417G Superalloy Joints, Materials Engineering, Vacuum, vol. 184, No. 10, 2021, 109967. (Abstract Only) https://www.sciencedirect.com/science/article/abs/pii/S0042207X20308277.

Lim et al., Nickel Base Wide Gap Brazing with Preplacement Technique, Part 1: Effect of Material and Process Parameters on Formation of Microvoids, Materials Science and Technology, vol. 11, No. 9, 955-960. (Abstract Only) https://doi.org/10.1179/mst.1995.11.9.955.

MacDonald et al., Transient Liquid Phase Bonding, Annual Review of Materials Research, vol. 22, 1992, 23-46. (Abstract Only) https://doi.org/10.1146/annurev.ms.22.080192.000323.

McGuire et al., Effect of Tungsten Addition on the Nucleation of Borides in Wide Gap Brazed Joint, Journal of Engineering for Gas Turbines and Power, vol. 132, Issue 6, 2010, 6 pages. (Abstract Only) https://doi.org/10.1115/1.4000136.

Norouzi et al., Effect of Bonding Temperature on the Microstructure and Mechanical Properties of Ti—6Al—4V to AISI 304 Transient Liquid Phase Bonded Joint, Materials & Design, vol. 99, 2016, 543-551. (Abstract Only) https://doi.org/10.1016/j.matdes.2016.03.101.

Oerlikon Metco. Web Link Only: www.oerlikon.com/metco.

Ojo et al., Effect of Gap Size and Process Parameters on Diffusion Brazing of Inconel 738, Science and Technology of Welding and Joining, vol. 9, Issue 3, 2004, 209-220. (Abstract Only) https://doi.org/10.1179/136217104225012175.

Ross et al., Rene'142: A High Strength, Oxidation Resistant DS Turbine Airfoil Alloy, Superalloys, 1992, 257-265. https://www.tms.org/Superalloys/10.7449/1992/Superalloys_1992_257_265.pdf.

Schoonbaert et al., Brazing and Wide Gap Repair of X-40 Using Ni-Base Alloys, Journal of Engineering for Gas Turbines and Power, vol. 130, May 2008, 032101-1-032101-10. https://asmedigitalcollection.asme.org/gasturbinespower/article-abstract/130/3/032101/466153.

Zhou et al., Modelling of Transient Liquid Phase Bonding, International Materials Reviews, vol. 40, No. 5, 1995, 181-196. https://uwaterloo.ca/centre-advanced-materials-joining/sites/default/files/uploads/files/modeling_of_transient_liquid_phase_bonding.pdf.

European Search Report Corresponding to Application No. 24195884 on Mar. 28, 2025.

Huang et al: "Wide Gap Braze Repair of Gas Turbine Blades and Vanes—A Review", Journal of Engineering for Gas Turbines and Power., vol. 134, No. 1, Jan. 1, 2012 (Jan. 1, 2012), 17 Pages.

* cited by examiner

METHOD OF BRAZE REPAIR FOR EUTECTIC PHASE REDUCTION

CROSS-REFERENCE TO RELATED APPLICATIONS

This application claims priority pursuant to 35 U.S.C. 119(a) to Polish Application No. P.446083, filed Sep. 12, 2023, which application is incorporated herein by reference in its entirety.

FIELD

The present disclosure relates generally to repairing high temperature performance alloys, e.g. superalloys.

BACKGROUND

Metal and alloy parts may experience various wear instances as a result of application fatigue. For example, cracking, abrasions, erosion or a variety of other acts may cause the removal or wear of original substrate material. To repair the worn parts, filler material may be added (e.g., welded or brazed) to fill in cracks, patch abrasions or otherwise replace material lost to erosion or has become defective during operation. To provide strong uniform mechanical properties across the repaired parts, filler material that is the same as, or substantially similar to, the substrate material can be used.

However, high temperature performance alloys (such as nickel and cobalt based super alloys used in hot gas path components of gas turbine parts) have high melting temperatures that require a significant application of energy before they can be applied to the original substrate material. As a result, the large amount of heat produced by a welding apparatus used to melt such filler materials can also affect the nearby substrate material. For example, heat can cause slumping, melting or other changes to the microstructure of the original substrate material. These changes in the substrate material can reduce the original component's strength, toughness and/or other physical characteristics.

While other filler materials with lower melting temperatures may alternatively be used, they may provide lower performance at high temperatures and/or possess mechanical properties that are increasingly different than the mechanical properties of the original substrate material. Additionally, the filler material may crack and lower the effectiveness of the repair.

BRIEF DESCRIPTION

Aspects and advantages of the methods in accordance with the present disclosure will be set forth in part in the following description, or may be obvious from the description, or may be learned through practice of the technology.

In accordance with one embodiment, a method of repairing an article having a surface and a defect is provided. The method includes forming a groove in the article at the defect and the top surface. The method further includes providing a superalloy powder to the groove such that the superalloy powder at least partially fills the defect and the groove. The method further includes providing a braze powder on the superalloy powder at the groove and the surface. The method further includes heating the article such that the braze powder becomes a liquified braze material and infiltrates the groove and the defect.

In accordance with another embodiment, a method of repairing a turbomachine component having a surface and a defect is provided. The method includes forming a groove in the article at the defect and the top surface. The method further includes providing a superalloy powder to the groove such that the superalloy powder at least partially fills the defect and the groove. The method further includes providing a braze powder on the superalloy powder at the groove and the surface. The method further includes heating the article to a temperature above a braze powder melting point and below a superalloy powder melting point. As a result, the braze powder becomes a liquified braze material and infiltrates the superalloy powder in the groove and the defect.

These and other features, aspects and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which.

DETAILED DESCRIPTION

Figure 1:
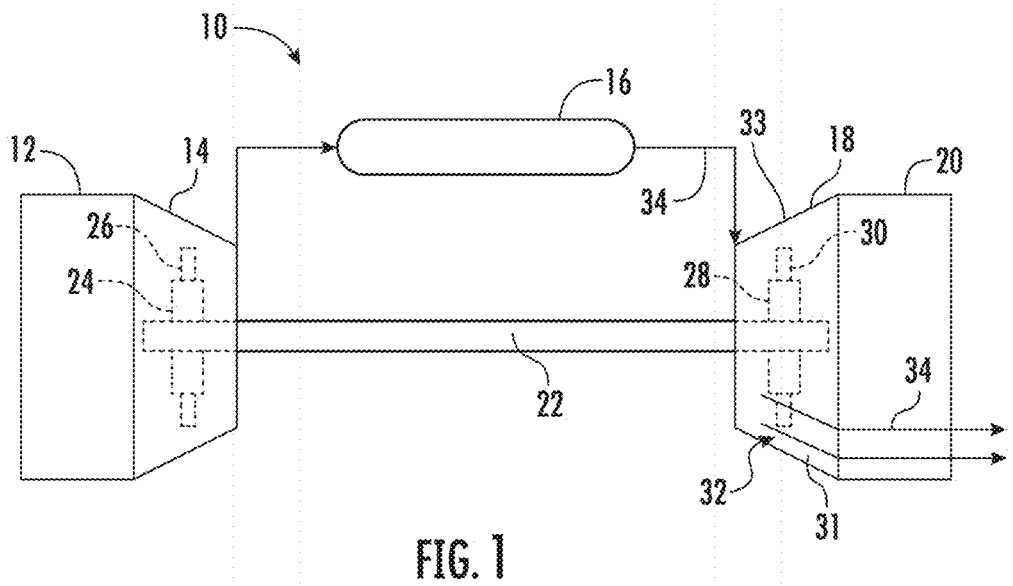
FIG. 1 is a schematic illustration of a turbomachine in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present)

and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor section 14 may further include one or more stator vanes arranged circumferentially around the shaft. The stator vanes may be fixed to a compressor casing or static casing that extends circumferentially around the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes a turbine casing 33 that circumferentially surround the portion of the shaft 22 and the rotor blades 30, thereby at least partially defining a hot gas path 32 through the turbine section 18. The turbine casing 33 may be configured to support a plurality of stages of stationary nozzles extending radially inwardly from the inner circumference of the turbine casing.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figures 2, 3, 4:
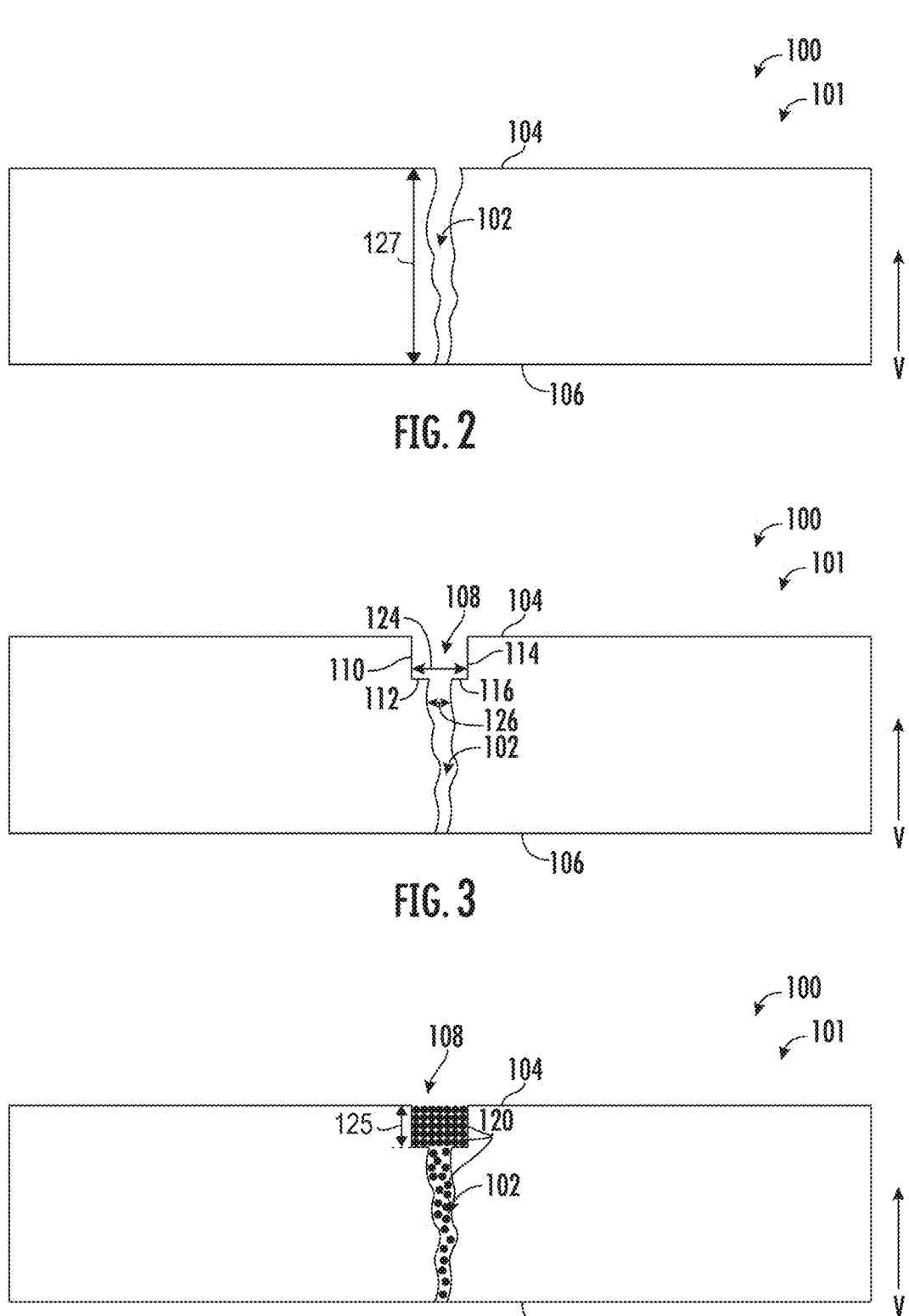
FIG. 2 illustrates a cross-sectional view of an article having a defect, in accordance with a first step in a method of repairing the defect in the article.
FIG. 3 illustrates a cross-sectional view of an article having a defect, in accordance with a second step in a method of repairing the defect in the article.
FIG. 4 illustrates a cross-sectional view of an article having a defect, in accordance with a third step in a method of repairing the defect in the article.

FIGS. 2 through 4 each illustrate a cross-sectional view of an article 100 having a defect 102 (such as a crack, a void, a separation, or others), in accordance with various aspects of the present disclosure. In exemplary embodiments, the article 100 may be a turbomachine component 101, such as a rotor blade, a stator vane, a portion of the turbine or compressor casing, a portion of the shaft, or other turbomachine component (e.g., any of the components of the gas turbine 10 discussed above with reference to FIG. 1). As shown, the article 100 may define a vertical direction V, which may extend opposite the direction of gravity. As used herein, "top" and "bottom" may be with reference to the vertical direction V.

As shown, the article 100 may have a top surface 104 and a bottom surface 106 opposite the top surface 104. The defect 102 may extend from the top surface 104 towards the bottom surface 106. The defect 102 may extend through the top surface 104, such that the defect 102 is exposed to the ambient environment at the top surface 104. In many embodiments, the defect 102 may terminate prior to the bottom surface 106, such that the defect 102 does not extend through the bottom surface 106. In other embodiments, the defect 102 may extend through the bottom surface 106.

FIGS. 2 through 4 may each illustrate the article 100 at various stages in a method of repairing the defect 102 in the article 100. FIG. 1 illustrates the article 100 prior to being machined and/or filled with superalloy powder and/or braze powder. In this stage, the article 100 may be cleaned to remove any dirt/debris prior to being machined. For example, the top surface 104, the bottom surface 106, and any exposed portions of the defect 102 may be cleaned.

In FIG. 3, a groove 108 may be formed in the article 100 at the defect 102 and the top surface 104, such that the groove 108 is connected to the defect 102. For example, the groove 108 may be machined or cut into the component using any suitable process, such as milling, turning, broaching, grinding, Electrical Discharge Machining (EDM), or others. Forming the groove 108 may include at removing at least a portion of the material surrounding the defect 102, thereby removing a portion of the defect 102. The groove 108 may be fluidly coupled to the defect 102, such that the void formed by the groove 108 is connected to the space of the defect 102.

In some embodiments, as shown best in FIG. 3, the groove 108 may be generally rectangularly shaped, such that the groove 108 may be defined collectively by a first side wall 110, a first floor 112, a second side wall 114, and a second floor 116. The first side wall 110 and the second side wall 114 may be disposed on opposite sides of the defect 102. The first floor 112 may extend from the first side wall 110 to the defect 102, and the second floor 116 may extend from the second side wall 114 to the groove 108. In other embodiments, the groove 108 may be curved or generally shaped as a semi-circle.

As shown in FIG. 3, the groove 108 may define a first width 124 and the defect 102 may define a second width 126. The first width 124 may be defined between the first side wall 110 and the second side wall 114. The second width 126 may be the maximum width of the defect 102 measured in the same direction as the first width 124. In exemplary embodiments, as shown, the first width 124 is larger than the second width 126. For example, the first width 124 may be at least 50% larger than the second width 126, or at least 100% larger than the second width 126, or at least 150% larger than the second width 126, or at least 200% larger than the second width 126, or at least 500% larger than the second width 126.

Similarly, as shown in FIGS. 2 and 4 collectively, the groove 108 may define a first length 125 and the defect 102 may define a second length 127. The first length 125 may be defined between the top surface 104 and the floor (e.g., the first floor 112 and/or the second floor 116). The first length 125 may be smaller than the second length 127. For example, the first length 125 may be between about 1% and about 70% of the second length 127, or such as between about 5% and about 50% of the second length 127, or such as between about 5% and about 25% of the second length 127, or such as between about 5% and about 15% of the second length 127.

In many embodiments, the article 100 may be formed from a superalloy material. The superalloy may be a nickel or iron or cobalt based superalloy. Particularly, the article 100 may be a gas turbine component that is formed from a high gamma prime superalloy. The superalloy may be formed of a conventionally cast (CC), directionally solidified (DS), or single crystal (SX) material. Examples of such high gamma prime superalloys include, but are not limited to, B-1900, GTD-111, Inconel 100, Inconel 713, Inconel 792, MAR-M-246, MAR-M-509, Rene 77, Rene 125, U-500, CMSX single crystal alloys, and others.

As shown in FIG. 4, a superalloy powder 120 may be provided to the groove 108 and the defect 102, such that the superalloy powder 120 at least partially fills the defect 102 and the groove 108. Notably, the superalloy powder 120 is not shown to scale, but rather is enlarged for the purpose of discussion and ease of illustration. The superalloy powder 120 may be the same material as the article 100, or the superalloy powder 120 may be a different material than the article 100. In some embodiments, the superalloy powder may be mixed with a binder, such as between about 5% and about 15% of a binder. In many embodiments, the superalloy powder 120 may be Rene 142 or a similar alloy (e.g., a rhenium-containing nickel-based superalloy). In other embodiments, the superalloy powder 120 may be CMSx4 or PWA 1426. In various embodiments, the superalloy powder 120 may be composed of, by weight, between about 6.3% and about 7.3% Chromium (Cr), between about 11% and about 13% Cobalt (Co), between about 1% and about 2% Molybdenum (Mo), between about 2.3% and about 3.3% Rhenium (Re), between about 4.4% and about 5.4% Tungsten (W), between about 5.65% and about 6.65% Aluminum (Al), between about 5.85% about 6.85% Tantalum (Ta), between about 1% and about 2% Hafnium (Hf), between about 0.005% and about 0.025% Boron (B), between about 0.05% and about 0.2% Carbon (C), between about 0.01 and about 0.03% Zirconium (Zr), and a balance (or remainder) of Nickel (Ni). Specifically, in exemplary embodiments, the superalloy powder 120 may be composed of, by weight, about 6.8% Chromium (Cr), about 12% Cobalt (Co), about 1.5% Molybdenum (Mo), about 2.8% Rhenium (Re), about 4.9% Tungsten (W), about 6.15% Aluminum (Al), about 6.35% Tantalum (Ta), about 1.5% Hafnium (Hf), about 0.015% Boron (B), about 0.12% Carbon (C), about 0.02% Zirconium (Zr), a balance (or remainder) of Nickel (Ni).

In various embodiments, as shown in FIG. 4, the superalloy powder 120 may be provided to the groove 108 and the defect 102 until the superalloy powder 120 is flush with the top surface 104 of the article 100 (e.g., not protruding or recessed from the top surface 104. This may involve applying an impact force to the article 100 or subjecting the article to vibrations (such as a shaker table or vibration table) to ensure the superalloy powder 120 has reached and settled in the entirety of the groove 108 and the defect 102 (e.g., the superalloy powder 120 has reached the bottom of the groove 108). This process may be iterated until the superalloy powder 120 has filled the defect 102 and the groove 108 such that the superalloy powder 120 is flush with the top surface 104.

Figures 5, 6:
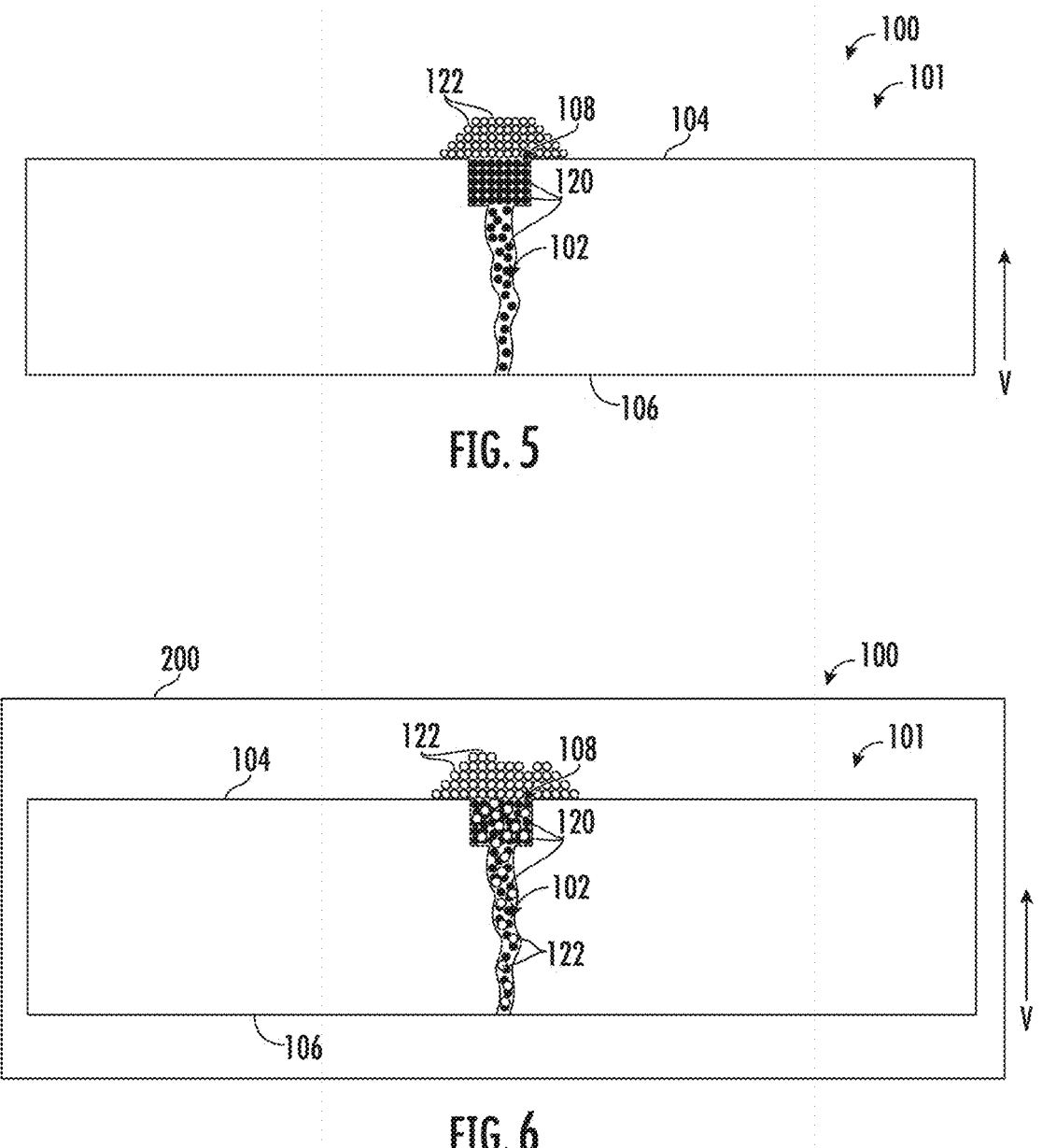
FIG. 5 illustrates a cross-sectional view of an article having a defect, in accordance with a fourth step in a method of repairing the defect in the article.
FIG. 6 illustrates a cross-sectional view of an article having a defect, in accordance with a fifth step in a method of repairing the defect in the article.

As shown in FIG. 5, a braze powder 122 may be provided on the top surface 104 and on top of the superalloy powder 120 that fills the groove 108 and the defect 102. As discussed above, the braze powder 122 and the superalloy powder 120 are not shown to scale but instead enlarged for discussion purposes. The braze powder 122 may be a mixture of a braze material and a superalloy material (which may be the same superalloy material as the article 100, a different superalloy material than the article 100, or the superalloy powder 120). In such embodiments, the braze powder 122 mixture may include between about 70% and about 100% braze material with a remainder being the superalloy material. Similarly, the superalloy powder 120 may be a mixture of superalloy material and braze material, such as between about 70% and 100% superalloy material with a remainder being braze material.

In various embodiments, the braze material in the braze powder 122 may be a nickel-based brazing alloy, which may be used alone, or which may be blended with a powder of a superalloy, such as those discussed above. The brazing powder may also be mixed with binders (e.g., between 5% and 15%). In many embodiments, the braze powder 122 may be Amdry DF4B or a similar braze alloy (such as Amdry DF-3 or Amdry 775). In various embodiments, the braze powder may be composed of, by weight, between about 13% and about 15% Chromium (Cr), between about 9% and about 11% Cobalt (Co), between about 3.25% and about 3.75% Aluminum (Al), between about 2.25% and about 2.75% Tantalum (Ta), between about 2.5% and about 3.0% Boron (B), between about 0.01% and about 0.10% Yttrium (Y), and balance of Ni. Specifically, in exemplary embodiments, the braze powder 122 may be composed of, by weight, about 14% Chromium (Cr), about 10% Cobalt (Co), about 3.5% Aluminum (Al), about 2.5% Tantalum (Ta), about 2.75% Boron (B), about 0.05% Yttrium (Y), a balance of Nickel (Ni).

As shown in FIG. 6, the article 100 may be heated, e.g., in a furnace or braze oven 200. That is the article may be subjected to a heat treatment known as a braze cycle, which occurs in a high vacuum furnace or braze oven 200. The position of the article 100 within the furnace depends on the cracks' orientation, and generally the parts are positioned in the way that the force of gravity, combined with the capillary force, facilitates the flow of the brazing alloy in most of the cracks to be brazed. During the braze cycle, the braze powder 122 liquifies and flows into the defect 102. Stated otherwise, when the article 100 is heated, the braze powder 122 may melt or liquify and infiltrate the groove 108 and the defect 102. That is, during the heating step, the braze powder 122 may transition to a liquid state and move downward with gravity into the groove 108, thereby filling the spaces between the still-solid superalloy powder 120 and mixing therewith. The liquid braze powder from the top surface 104 flows to the defect 102 towards the bottom surface 106, thereby infiltrating the superalloy powder 120 (which are still in a solid phase) in the notch so that the solid-phase superalloy powder 120 is dissolved in the liquid braze material.

Particularly, in exemplary embodiments, the article 100 may be heated in the braze oven 200 to a temperature that is above a braze powder melting point and below a superalloy powder melting point. As a result, the braze powder 122 becomes a liquified braze material and infiltrates the still-solid superalloy powder 120 in the groove 108 and the defect 102.

Subsequently, the article 100 may cool, such that the braze material solidifies within the groove 108 and the defect 102. Post processing procedures may be implemented to finalize the repair of the article 100, such as removing excess braze material from the top surface, cleaning the braze joint, or others. For example, a blending tool may be used to smooth the excess braze material and create a blended surface with the top surface 104.

Figure 7:
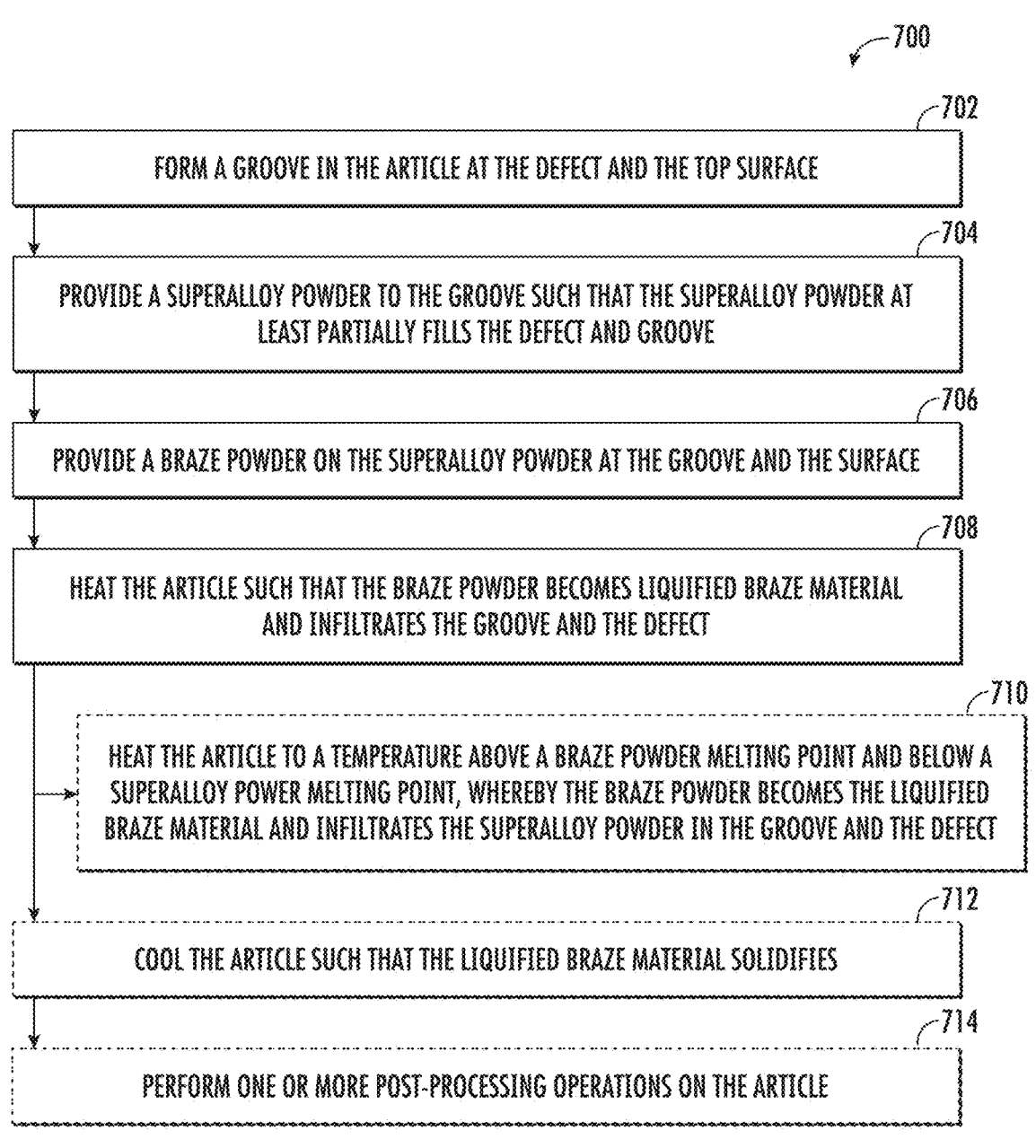
FIG. 7 is a flow chart of a method of repairing an article having a surface and a defect, in accordance with embodiments of the present disclosure.

Referring now to FIG. 7, a flow diagram of one embodiment of a method 700 of repairing an article having a surface and a defect is illustrated in accordance with embodiments of the present subject matter. In general, the method 700 will be described herein with reference to the articles 100 described above with reference to FIGS. 2-6. In addition, although FIG. 7 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, the method 700 may include at (702) forming a groove in the article at the defect and the top surface. The groove may be cut or machines in the article using any suitable process, such as milling, turning, broaching, grinding, Electrical Discharge Machining (EDM), or others. Forming the groove may include at removing at least a portion of the material surrounding the defect, thereby removing a portion of the defect from the article. The groove may be fluidly coupled to the defect, such that the groove and the defect form a continuous void in the article. The forming step 702 may be the first step performed as part of the method 700. In some implementations, the article may be cleaned prior to and/or after the forming step 702 to remove debris.

In many implementations, the method may include forming the groove in the article at the defect and the top surface such that the groove is disposed on either side of the defect. In other embodiments, the groove may only be disposed on one side of the defect but still in fluid communication therewith. Additionally, in various implementations, at least a portion of the defect is removed by forming the groove in the article at the top surface. For example, the portion of the article surrounding and at least partially defining the groove may be removed to form the groove, thereby removing a portion of the defect.

The method 700 may further include at (704) providing a superalloy powder to the groove such that the superalloy powder at least partially fills the defect and the groove. In various implementations, the superalloy powder may be provided to the groove and the defect until the superalloy powder is flush with the top surface of the article (e.g., not protruding or recessed from the top surface. This may include applying an impact force to the article or subjecting the article to vibrations (such as a shaker table or vibration table), e.g., during the providing step 704, to ensure the superalloy powder has reached and settled in the entirety of the groove and the defect (e.g., the superalloy powder 120 has reached the bottom of the groove). This process may be iterated until the superalloy powder has filled the defect and the groove such that the superalloy powder is flush with the top surface. For example, a first amount of superalloy powder may be provided to the groove and the defect, the article may be subject to an impact force or vibrations, a second amount of powder may be provided to the groove and the defect, and so on.

The method 700 may further include at (706) providing a braze powder on the superalloy powder at the groove and the surface. Particularly, step 706 may be after step 704, and the braze powder may be provided on top of the superalloy powder that has already been provided to the groove and the defect. In this way, the braze powder may form a mound or protrusion on top of the surface and on top of the superalloy powder in the groove.

The method 700 may further include at (708) heating the article such that the braze powder becomes a liquified braze material and infiltrates the groove and the defect. Particularly, as shown by the optional dashed box, the heating step (708) may further include at (710) heating the article to a temperature above a braze powder melting point and below a superalloy powder melting point, whereby the braze powder becomes the liquified braze material and infiltrates the superalloy powder in the groove and the defect. The heating steps 708 and 710 may be performed within a furnace or braze oven. In many implementations, during the heating step, the liquified braze material may mix with the superalloy powder (which is still in a solid state) in the groove and the defect such that the superalloy powder at least partially dissolves in the liquified braze material. For example, larger particles of the superalloy powder may not dissolve while smaller particles of the superalloy powder will dissolve.

In many embodiments, the method 700 may further include at (712) cooling the article such that the liquified braze material solidifies. This may include removing the article from the braze oven or furnace, thereby allowing the article and liquified braze material to solidify within the defect and the groove. Additionally, the method 700 may include at (714) performing one or more post-processing operations on the article. Post-processing operations may be implemented to finalize the repair of the article, such as removing excess braze material from the top surface, cleaning the braze joint, or others.

The method disclosed herein advantageously provides for an increased strength braze repair when compared to prior methods. Specifically, the groove created above the defect provides for a braze joint with increased strength due to the formation of less eutectic chains during the braze repair. For example, the liquid braze material from the upper layer flows to the bottom of the crack in the brazing process, infiltrating the high-melting point superalloy powder in the groove. The small (e.g., smaller than the braze powder particles), solid-phase, particles of the superalloy powder are dissolved in the liquid braze material. The larger particles of the superalloy powder are partially dissolved in the liquid braze material, so the quantity of the liquid phase is reduced in the overall material flowing into the defect (e.g., the liquid braze material and the at least partially dissolved solid-phase superalloy powder). This results in less eutectic chains forming at a midline of the defect, thereby increasing the strength of the braze joint.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of repairing an article having a surface and a defect, the method comprising: forming a groove in the article at the defect and the surface; providing a superalloy powder to the groove such that the superalloy powder at least partially fills the defect and the groove; providing a braze powder on the superalloy powder at the groove and the surface; and heating the article such that the braze powder becomes a liquified braze material and infiltrates the groove and the defect.

The method as in any preceding clause, wherein the heating step further comprises: heating the article to a temperature above a braze powder melting point and below a superalloy powder melting point, whereby the braze powder becomes the liquified braze material and infiltrates the superalloy powder in the groove and the defect.

The method as in any preceding clause, wherein, during the heating step, the liquified braze material mixes with the superalloy powder in the groove and the defect such that the superalloy powder at least partially dissolves in the liquified braze material.

The method as in any preceding clause, wherein the article is a formed from a superalloy material.

The method as in any preceding clause, wherein the forming step further comprises: forming the groove in the article at the defect and the surface such that the groove is disposed on either side of the defect.

The method as in any preceding clause, wherein at least a portion of the defect is removed by forming the groove in the article at the surface.

The method as in any preceding clause, wherein the article is a turbomachine component.

The method as in any preceding clause, wherein the groove defines a first width and the defect defines a second width, wherein the first width is larger than the second width.

The method as in any preceding clause, further comprising: cooling the article such that the liquified braze material solidifies; and performing one or more post-processing operations on the article.

The method as in any preceding clause, wherein the superalloy powder comprises, by weight, between about 6.3% and about 7.3% Chromium (Cr), between about 11% and about 13% Cobalt (Co), between about 1% and about 2% Molybdenum (Mo), between about 2.3% and about 3.3% Rhenium (Re), between about 4.4% and about 5.4% Tungsten (W), between about 5.65% and about 6.65% Aluminum (Al), between about 5.85% about 6.85% Tantalum (Ta), between about 1% and about 2% Hafnium (Hf), between about 0.005% and about 0.025% Boron (B), between about 0.05% and about 0.2% Carbon (C), between about 0.01 and about 0.03% Zirconium (Zr), and a balance of Nickel (Ni).

The method as in any preceding clause, wherein the braze powder comprises, by weight, between about 13% and about 15% Chromium (Cr), between about 9% and about 11% Cobalt (Co), between about 3.25% and about 3.75% Aluminum (Al), between about 2.25% and about 2.75% Tantalum (Ta), between about 2.5% and about 3.0% Boron (B), between about 0.01% and about 0.10% Yttrium (Y), and balance of Ni.

A method of repairing a turbomachine component having a surface and a defect, the method comprising: forming a groove in the turbomachine component at the defect and the surface; providing a superalloy powder to the groove such that the superalloy powder at least partially fills the defect and the groove; providing a braze powder on the superalloy powder at the groove and the surface; and heating the turbomachine component to a temperature above a braze powder melting point and below a superalloy powder melting point, whereby the braze powder becomes a liquified braze material and infiltrates the superalloy powder in the groove and the defect.

The method as in any preceding clause, wherein, during the heating step, the liquified braze material mixes with the superalloy powder in the groove and the defect such that the superalloy powder at least partially dissolves in the liquified braze material.

The method as in any preceding clause, wherein the turbomachine component is a formed from a superalloy material.

The method as in any preceding clause, wherein the forming step further comprises: forming the groove in the turbomachine component at the defect and the surface such that the groove is disposed on either side of the defect.

The method as in any preceding clause, wherein at least a portion of the defect is removed by forming the groove in the turbomachine component at the surface.

The method as in any preceding clause, wherein the groove defines a first width and the defect defines a second width, wherein the first width is larger than the second width.

The method as in any preceding clause further comprising: cooling the turbomachine component such that the liquified braze material solidifies; and performing one or more post-processing operations on the turbomachine component.

The method as in any preceding clause, wherein the superalloy powder comprises, by weight, between about 6.3% and about 7.3% Chromium (Cr), between about 11% and about 13% Cobalt (Co), between about 1% and about 2% Molybdenum (Mo), between about 2.3% and about 3.3% Rhenium (Re), between about 4.4% and about 5.4% Tungsten (W), between about 5.65% and about 6.65% Aluminum (Al), between about 5.85% about 6.85% Tantalum (Ta), between about 1% and about 2% Hafnium (Hf), between about 0.005% and about 0.025% Boron (B), between about 0.05% and about 0.2% Carbon (C), between about 0.01 and about 0.03% Zirconium (Zr), and a balance of Nickel (Ni).

The method as in any preceding clause, wherein the braze powder comprises, by weight, between about 13% and about 15% Chromium (Cr), between about 9% and about 11% Cobalt (Co), between about 3.25% and about 3.75% Aluminum (Al), between about 2.25% and about 2.75% Tantalum (Ta), between about 2.5% and about 3.0% Boron (B), between about 0.01% and about 0.10% Yttrium (Y), and balance of Ni.

What is claimed is:

1. A method of repairing an article having a surface and a defect, the method comprising:
   machining a groove in the article at the defect and the surface, wherein the groove defines a first depth and the defect defines a second depth, and wherein the first depth is less than the second depth;
   providing a superalloy powder to the groove such that the superalloy powder at least partially fills the defect and the groove;

12 providing a braze powder on the superalloy powder at the groove and the surface; and
heating the article such that the braze powder becomes a liquified braze material and infiltrates the groove and the defect.

2. The method as in claim 1, wherein the heating step further comprises:
   heating the article to a temperature above a braze powder melting point and below a superalloy powder melting point, whereby the braze powder becomes the liquified braze material and infiltrates the superalloy powder in the groove and the defect.

3. The method as in claim 1, wherein, during the heating step, the liquified braze material mixes with the superalloy powder in the groove and the defect such that the superalloy powder at least partially dissolves in the liquified braze material.

4. The method as in claim 1, wherein the article is a formed from a superalloy material.

5. The method as in claim 1, wherein the machining step further comprises:
   machining the groove in the article at the defect and the surface such that the groove is disposed on either side of the defect.

6. The method as in claim 1, wherein only a portion of the defect is removed by machining the groove in the article at the surface.

7. The method as in claim 1, wherein the article is a turbomachine component.

8. The method as in claim 1, wherein the groove defines a first width and the defect defines a second width, wherein the first width is larger than the second width.

9. The method as in claim 1, further comprising:
   cooling the article such that the liquified braze material solidifies; and
   performing one or more post-processing operations on the article.

10. The method as in claim 1, wherein the superalloy powder comprises, by weight, between about 6.3% and about 7.3% Chromium (Cr), between about 11% and about 13% Cobalt (Co), between about 1% and about 2% Molybdenum (Mo), between about 2.3% and about 3.3% Rhenium (Re), between about 4.4% and about 5.4% Tungsten (W), between about 5.65% and about 6.65% Aluminum (Al), between about 5.85% about 6.85% Tantalum (Ta), between about 1% and about 2% Hafnium (Hf), between about 0.005% and about 0.025% Boron (B), between about 0.05% and about 0.2% Carbon (C), between about 0.01 and about 0.03% Zirconium (Zr), and a balance of Nickel (Ni).

11. The method as in claim 1, wherein the braze powder comprises, by weight, between about 13% and about 15% Chromium (Cr), between about 9% and about 11% Cobalt (Co), between about 3.25% and about 3.75% Aluminum (Al), between about 2.25% and about 2.75% Tantalum (Ta), between about 2.5% and about 3.0% Boron (B), between about 0.01% and about 0.10% Yttrium (Y), and balance of Ni.

12. A method of repairing a turbomachine component having a surface and a defect, the method comprising:
   machining a groove in the turbomachine component at the defect and the surface, wherein the groove defines a first depth and the defect defines a second depth, and wherein the first depth is less than the second depth;
   providing a superalloy powder to the groove such that the superalloy powder at least partially fills the defect and the groove;

providing a braze powder on the superalloy powder at the groove and the surface; and heating the turbomachine component to a temperature above a braze powder melting point and below a superalloy powder melting point, whereby the braze powder becomes a liquified braze material and infiltrates the superalloy powder in the groove and the defect.

13. The method as in claim 12, wherein, during the heating step, the liquified braze material mixes with the superalloy powder in the groove and the defect such that the superalloy powder at least partially dissolves in the liquified braze material.

14. The method as in claim 12, wherein the turbomachine component is a formed from a superalloy material.

15. The method as in claim 12, wherein the machining forming step further comprises:

machining the groove in the turbomachine component at the defect and the surface such that the groove is disposed on either side of the defect.

16. The method as in claim 12, wherein only a portion of the defect is removed by machining the groove in the turbomachine component at the surface.

17. The method as in claim 12, wherein the groove defines a first width and the defect defines a second width, wherein the first width is larger than the second width.

18. The method as in claim 12, further comprising:

cooling the turbomachine component such that the liquified braze material solidifies; and performing one or more post-processing operations on the turbomachine component.

19. The method as in claim 12, wherein the superalloy powder comprises, by weight, between about 6.3% and about 7.3% Chromium (Cr), between about 11% and about 13% Cobalt (Co), between about 1% and about 2% Molybdenum (Mo), between about 2.3% and about 3.3% Rhenium (Re), between about 4.4% and about 5.4% Tungsten (W), between about 5.65% and about 6.65% Aluminum (Al), between about 5.85% about 6.85% Tantalum (Ta), between about 1% and about 2% Hafnium (Hf), between about 0.005% and about 0.025% Boron (B), between about 0.05% and about 0.2% Carbon (C), between about 0.01 and about 0.03% Zirconium (Zr), and a balance of Nickel (Ni).

20. The method as in claim 1, wherein the first depth is between about 1% and about 70% of the second depth.

* * * * *